United States Patent [19]

Strobel

[11] 4,374,865

[45] Feb. 22, 1983

[54] ORANGE JUICE CONCENTRATE

[75] Inventor: Rudolf G. Strobel, Cincinnati, Ohio

[73] Assignee: The Procter & Gamble Company, Cincinnati, Ohio

[21] Appl. No.: 282,830

[22] Filed: Jul. 13, 1981

Related U.S. Application Data

[63] Continuation-in-part of Ser. No. 171,057, Jul. 22, 1980, abandoned.

[51] Int. Cl.³ ............................ A23L 2/14; A23L 2/12
[52] U.S. Cl. ................................... 426/599; 426/384; 426/495
[58] Field of Search ............... 426/599, 384, 385, 474, 426/495

[56] References Cited

U.S. PATENT DOCUMENTS

| | | | |
|---|---|---|---|
| 2,187,572 | 1/1940 | Meinzer | 426/384 |
| 2,552,525 | 5/1951 | Wenzelberger | 426/384 |
| 2,559,204 | 7/1951 | Wenzelberger | 426/384 |
| 2,588,337 | 3/1952 | Sperti | 426/384 |
| 2,735,779 | 2/1956 | Wenzelberger | 426/384 |
| 3,140,187 | 7/1964 | Brent | 426/599 |

OTHER PUBLICATIONS

Nelson, et al.; Fruit and Vegetable Juice Processing Technology, 3rd Ed.; AVI Publishing Co., Westport, Conn. ©1980, pp. 63, 64.
Ahmed et al., J. Agri. Food Chem., 26, 368 (1978).
Food Engineering, 27, 70 (1955).
Schreier et al., Chem. Microbio. Technol., Lebenson, 6, 78-83 (1979).
Proc. Int. Soc. Citriculture, 3, 756-762 (1977), Mannheim et al., "Recovery and Concentration of Citrus Aroma".
Food Technology 22, 97-100 (1968), Merson et al., "Juice Concentration by Reverse Osmosis".

Primary Examiner—Raymond N. Jones
Assistant Examiner—Elizabeth J. Curtin
Attorney, Agent, or Firm—Rose Ann Dabek; Julius P. Filcik; Richard C. Witte

[57] ABSTRACT

A natural orange juice concentrate prepared from natural orange compounds is disclosed. The orange juice concentrate has at least 35% solids including pulp, non-volatile compounds, pectin and volatile compounds. This orange juice concentrate has at least 65% of the aroma and flavor volatile compounds of the natural juice. The aroma and flavor volatile compounds comprise a low boiling fraction and a higher boiling fraction in a ratio of at least 4:1. The ethyl butyrate level is at least 0.1% of the total volatile compounds, the proportion of ethyl butyrate to limonene being in the range of 0.0015:1 to about 0.6:1.

The orange juice concentrate is prepared by separating natural orange juice into a pulp portion and a serum portion. The serum portion which comprises 7% to 20% solids and from 80% to 93% water is concentrated by removing essentially pure water. The concentration step can be accomplished by freeze concentration or by sublimation concentration. When sublimation concentration is used, the pulp does not have to be separated from the serum. Substantially 100% of the non-volatile solids are retained. Moreover, the product is substantially free of oxidative degradation products.

22 Claims, 6 Drawing Figures

ORANGE JUICE CONCENTRATE

This is a continuation-in-part of copending patent application Ser. No. 171,057, filed July 22, 1980, now abandoned.

BACKGROUND OF THE INVENTION

Oranges, like most fruits and vegetables have specific growing seasons. They grow only under certain climatic conditions such as occur in regions of Florida, Arizona, California, Texas, Brazil, Spain, Italy, Israel and Egypt and are available only for limited periods of time during the year. Thus, certain oranges may periodically be in short supply. For instance, Florida Valencia oranges which are used in most commercial orange juice products are available only from April through August. In order to have good quality orange juice available year-round, the orange juice must be processed for storage and distribution.

In the following discussion, references are made to aroma and flavor compounds present in orange juice and orange juice concentrates. It is known that organoleptic attributes of any commercial beverage are important to consumer acceptance; however, such attributes are uniquely involved in orange juice acceptability. The term organoleptic is defined as "affecting or employing one or more of the organs of special sense", i.e. taste, smell, etc.

The challenge of producing an orange juice product which is acceptable to a broad range of consumers, involves making a unique product having acceptable flavor, i.e. taste; distinctive aroma, i.e. smell; acceptable appearance, i.e. sight; and satisfactory mouthfeel, i.e. touch. The aroma and flavor compounds in oranges affect each of these organoleptic properties. This is surprising because although there are many aroma and flavor compounds which comprise orange juice, they are present in relatively small amounts.

The difficulty of producing a unique orange juice concentrate having superior quality can be appreciated when one considers that orange juice concentrates have been available for several decades and that natural orange juice products are enjoyed by a large proportion of the general public. Thus in order to find broad acceptance a new orange juice concentrate product must overcome the acquired taste preferences of a large segment of the orange juice-consuming public.

Nevertheless, an important objective achieved by the present invention is that a natural orange juice concentrate product is prepared, and a process for its production is provided, which are uniquely different from previously known orange juice products and processes. It is surprising that the orange juice concentrate of this invention when reconstituted is superior to, and distinguishable from, freshly squeezed orange juice. This distinction is in taste as well as product stability. These and other benefits are achieved because the product and processes described herein offer unexpected improvements in virtually all of the organoleptic senses mentioned above. These unexpected improvements and advantages are described and illustrated hereinafter.

Since orange juice contains about 80% to 90% water, the most economical way to store and distribute the juice is in a concentrated form. The bulk of the orange juice commercially processed in the United States since 1950 has been as a frozen concentrated orange juice product.

Most commercial concentration processes utilize evaporation techniques to remove the bulk of the water from the juice. However, it is widely recognized that evaporation techniques result in the undesired removal or loss of volatile aroma and flavor compounds along with water, thereby resulting in a significant deterioration in quality and overall aroma and flavor of the concentrated juice.

Evaporation processes involve heating the juice under conditions which promote oxidation of compounds in the juice. This can cause the aroma and flavor compounds in the orange juice to be chemically altered. For instance, lipids can be oxidized and the amino acids and sugars can undergo browning reaction. Such degradation products can cause off-flavors in the orange juice concentrates.

Numerous methods have been devised to compensate for the loss of aroma and flavor during evaporation concentration processes. For instance, U.S. Pat. No. 3,140,187, issued to Brent (1964) discloses a method of minimizing the overall loss of aroma and flavor compounds by collecting "essence" of the juice. Essence is the term applied to the first 15% to 20% of the water which is removed through evaporation and which contains a significant amount of volatile aroma and flavor compounds. The escaping essence is condensed, the aroma and flavor compounds recovered and then added back to concentrated juice. However, this procedure is not totally satisfactory because only a fraction of the escaping aroma and flavor volatile compounds can be collected and recovered. Thus, there is necessarily a net loss in overall aroma and flavor of the final concentrated product.

Others have tried different procedures for adding back certain volatile compounds and essences to concentrated orange juice to enhance the overall flavor and consumer acceptability of the juice. Ahmed et al., *J. Agri, Food Chemistry*, 1978, 368-372, describe the addition of certain volatile compounds of essences to juice concentrate after it is recovered from the evaporator. The objective was to match the aroma and flavor found in fresh orange juice.

It is fairly widely recognized that while evaporation concentration processes are useful and fairly effective, there is still a significant loss of aroma and flavor compounds which occurs.

Freeze concentration equipment provides an alternative to the use of evaporators. In freeze concentrators the objective is to remove water in the form of ice crystals.

U.S. Pat. No. 2,187,572, issued to Meinzer (1940) describes an orange juice concentrate which was prepared by extracting juice, centrifuging the juice to recover a pulp portion and provide a liquid centrifugate, freeze concentrating the centrifugate, and adding back the pulp portion to the concentrated juice. Meinzer suggests that the resulting juice product when reconstituted with water approaches the taste of the starting juice. Specific concentrations of volatile aroma and flavor compounds, and the identification of the key compounds retained within his pocket are not described.

Schreier et al., *Chem. Microbiol. Technol. Lebensm*, 6, 78-83 (1979) analyzed the behavior of volatile aroma compounds during freeze concentration of orange juice. During the course of freeze concentration the aroma and flavor compounds were analyzed by gas chromatography and quantitatively determined in the successive juice concentrates as well as in the successively separated ice. Significant amounts of aroma and flavor compounds were found to be removed in separated ice. Average loss of aroma and flavor compounds in the ice during each successive concentration was estimated to be around 12%. It is evident also that a loss of overall quality occurred because a number of oxidation products were formed during this freeze concentration process, such as nootkatone, carvone, geraniol, and alpha-terpineol. The formation of these oxidation products and similar compounds can result in a juice product having a notable off-flavor.

Although Schreier employed a freeze concentration process, his analytical data reveal that significant losses of volatile compounds were experienced. Moreover, because of the open processing used by both Meinzer and Schreier et al., oxidation products are produced. Ideally, in freeze concentration only pure ice should be removed without removing any of the aroma and flavor compounds present in the original juice. If the recovered ice contains occluded aroma and flavor compounds, an inferior quality juice concentrate is produced.

From the foregoing discussion, it can be seen that a generalized procedure for producing an orange juice concentrate involves first extracting the juice from the orange and separating the juice from the rag and seed material. The juice can be separated into a pulp portion and a serum portion. The pulp may be further treated to separate the useful pulp from any small seeds and, if desired, to alter the quantity and size of the pulp. Eventually the pulp is recombined with processed serum.

The serum is concentrated by removing water to produce a concentrated serum. Some serum concentration processes are done in the presence of pulp. Typically, a last step may involve blending the concentrate with a desired amount of pulp to produce a final concentrated product which can be packaged and distributed.

The serum, which remains after pulp, rag, and seed are separated, is known to contain essentially water and the compounds which are responsible for the distinct orange aroma and flavor. As a matter of fact, however, it is probably not possible to categorically assign one specific function to any given ingredient. For instance, a chemical compound which contributes to the orange aroma may also contribute to the orange flavor.

A process for making an orange juice concentrate which can be a pasteurized product and which has substantially 100% of the non-volatile compounds originally present in the serum and at least 65% of the aroma and flavor volatile compounds is very desirable. Moreover, if such a process did not cause oxidative degradation of the solids in the juice, this process would produce a concentrate which, when diluted, would taste as good as, or better than the original juice.

It is an object of the present invention to produce a natural orange juice concentrate having at least 35% solids. The solids comprise pulp, non-volatile compounds and at least 65% of the aroma and flavor volatile compounds which were present in the orange juice. It is believed that such a concentrated orange juice product has never been made before this invention. These retained volatile and non-volatile compounds are the very compounds which contribute importantly to the pleasant flavor and aroma of the product.

An important contributor to the fruity character of orange juice aroma and flavor is ethyl butyrate. At least about 0.1% of the aroma and flavor volatile compounds present in the orange juice concentrate of the instant invention is ethyl butyrate. A second important volatile compound, limonene, is also retained.

It is a further object of this invention to produce an orange juice concentrate which when reconstituted tastes as good as, or better, than the starting juice.

It is still another object of this invention to produce an orange juice concentrate which can be used as a flavorant in beverages, including carbonated beverages, dry mixes and alcoholic beverages, candies, baked goods and culinary mixes.

A preferred object of this invention is to produce an orange juice concentrate which contains less than organoleptically detectable amounts of hydrogen sulfide and which is substantially free of microorganisms, enzyme activity and oxidative degradation products.

These and other objects of this invention will become apparent by the description of the invention below.

All percentages herein are by weight unless otherwise defined.

SUMMARY OF THE INVENTION

Figure 1:
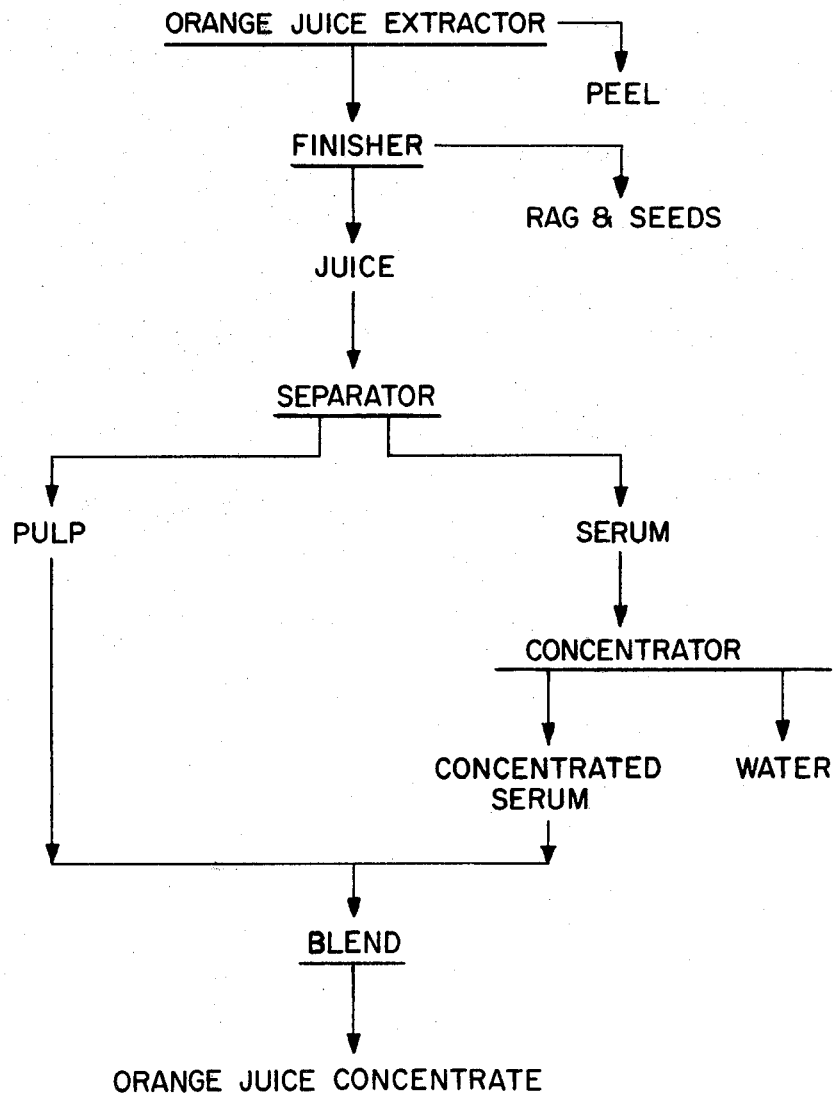
FIG. 1 is a diagram of the process used to prepare the orange juice concentrate. Oranges are put into a juice extractor. Peels are removed and the juice passed through a finisher which removes the rag and seed. The juice is separated into a pulp portion and a serum portion. The serum is passed through a concentrator which may be a freeze concentrator or a freeze dryer which is used for sublimation concentration, or a combination of these. The water is separated from the serum as pure ice in the freeze concentrator and as pure water vapor in the sublimation concentration. The concentrated serum and pulp are then blended to form a natural orange juice concentrate.

A natural orange juice concentrate is disclosed which is made from orange juice comprising a pulp portion and a serum portion. The serum portion comprises about 80% to 93% water and about 7% to 20% other compounds. These include both soluble and suspended solids, e.g. non-volatile and volatile aroma and flavor compounds. The volatile compounds comprise a lower boiling fraction and a higher boiling fraction; the lower boiling fraction contains ethyl butyrate, and the higher boiling fraction contains limonene.

The natural orange juice concentrate comprises:
(1) at least 35% total solids comprising pulp, non-volatile and volatile flavor and aroma compounds, two of the volatile compounds being ethyl butyrate and limonene;
(2) at least 0.1% of said volatile compounds being ethyl butyrate;
(3) the proportion of said butyl butyrate to said limonene being in the range of about 0.0015:1 to about 0.6:1, the amounts and proportions of said volatile compounds being based on a gas chromatographc analysis of the headspace volatile compounds released from a sample, said sample having a temperature of 40° C.

At least 65% of the volatile flavor and aroma compounds originally present in the juice are present in this orange juice concentrate.

Also disclosed is a process for making an orange concentrate product comprising the steps of:

(1) extracting orange juice from oranges, said juice containing from about 7% to about 20% pulp, from about 8% to 20% solids, the balance being water;

(2) separating said juice into a pulp portion and a serum portion, said serum portion containing from about 7% to about 20% solids, and about 80% to 93% water;

(3) passing said serum portion to a freeze concentrating zone in which essentially pure ice crystals are formed and separated without removing substantial amounts of adhering solids, said separating step and said freeze concentrating steps being performed under an inert atmosphere so as to avoid substantially any oxidative degradation of said solids;

(4) recovering a frozen concentrate product from said concentration zone which contains from about 20% to about 52% solids and from about 48% to about 80% water; and (5) blending said concentrate with the pulp separated in step (2).

Processes wherein the juice, serum, pulp or concentrate are pasteurized at 80° C. to 95° C. for from about 3 to 15 seconds in a closed system are also disclosed.

An additional method of preparing the orange juice concentrate comprises the steps of:

(1) extracting orange juice from oranges, said juice containing from about 7% to about 20% pulp. from about 8% to about 20% solids, the balance being water;

(2) passing said juice to a sublimination concentration zone in which essentially pure water vapor is removed, said sublimation concentration being performed under an inert atmosphere so as to avoid substantially any oxidative degradation of said solids;

(3) recovering a frozen concentrate product from said concentration zone which contains from about 20% to about 87% solids and from about 13% to about 80% water.

A combination freeze concentration and sublimation concentration process can also be used.

DEFINITIONS

The natural orange juice concentrate of the present invention is prepared from orange juice. The juice comprises a pulp portion and a serum portion. The juice may be freshly squeezed, pasteurized juice, or frozen juice.

As used herein, the pulp portion includes the suspended solids of the juice. Some serum will always be present with the pulp portion. The pulp portion includes the juice sacs, orange juice lipids, cellulose, hemicellulose, pectin and proteinaceous material. Most of the chromatophores, i.e. the coloring compounds of the juice, are also found in the pulp portion.

The serum portion comprises about 80% to about 93% water and from about 7% to about 20% other or non-aqueous compounds. The non-aqueous compounds of the serum are both soluble and suspended solids and comprise non-volatile compounds and volatile compounds.

The non-volatile compounds are carbohydrates, carbohydrate derivatives, edible acids, enzymes, lipids, minerals, flavonoids, carotenes, vitamins, etc. The carbohydrates are primarily sucrose, fructose and glucose. The edible acids include citric acid, isocitric acid, ascorbic acid, malic acid, fumaric acid, oxalic acid, and the amino acids.

The volatile compounds are those compounds which are swept from an orange juice sample, i.e. a concentrate reconstituted to single strength juice (from 7% to 20% solids), as follows: Fifty ml of nitrogen per minute is passed through the sample for 5 minutes to remove the volatile compounds. During this sweeping operation the temperature of the sample is held at 40° C.±0.5° C. The volatile compounds are then collected at liquid nitrogen temperatures and measured gas chromatographically by the method described herein.

The volatile compounds include a low boiling fraction, i.e. the highly volatile portion, and a higher boiling fraction, i.e. the lesser volatile fraction.

The low boiling fraction compounds are eluted first from the capillary gas chromatographic column described in detail later. These compounds are characterized by having a boiling point less than 131° C. The low boiling compounds include, but are not limited to, acetaldehyde, methanol, ethanol, butanol, hexanal, ethyl butyrate, etc.

The higher boiling fraction is those compounds which elute after the low boiling compounds. These compounds have a boiling point above 131° C. These lesser volatile compounds include, but are not limited to, linalool, limonene, beta-pinene, alpha-pinene, myrcene, geranial, octanal, decanal, etc.

The low boiling fraction to higher boiling fraction ratio is determined by dividing the total gas chromatographic counts of the low boiling compounds by the total gas chromatographic counts of the higher boiling compounds excluding the counts attributable to limonene. Gas chromatographic counts are the automatically integrated peak areas of the gas chromatograph recorder. They are directly related to the concentration of each of the compounds present in the volatile mixture.

The ratio of ethyl butyrate to limonene is determined by the following fraction:

$$\frac{\text{Ethyl butyrate } GC \text{ counts}}{\text{Limonene } GC \text{ counts}}$$

"Substantially 100% of the non-volatile solids" means that at least 99% of these compounds are present in the concentrate in a form which is substantially unchanged.

The enzymes may be deactivated if the product is pasteurized.

"Substantially free of" means less than 1% of the compound is present in the concentrate.

DETAILED DESCRIPTION OF THE INVENTION

The natural orange juice concentrate composition herein is made from all natural product, i.e. wholly from oranges.

Orange juice concentrate is made primarily from four varieties of oranges, Pineapple, Hamlin, Parson Brown, and principally, Valencia oranges. Tangerines, mandarin oranges, blood oranges, and naval oranges can also be used. The juices from these oranges can be used alone or blended to produce optimum flavor characteristics.

One reason for blending the different varieties of oranges is to adjust the sugar to acid ratio of the oranges. The sugar to acid ratio is the ratio of total soluble solids to total acidity of the orange juice. The sugar to acid ratio is closely associated with the edible quality of the orange. Immature oranges have a low sugar to acid ratio. As the orange matures and approaches good eating quality, the sugar to acid ratio increases. A sugar to acid ratio of 8:1 to about 20:1 is considered acceptable. The preferred sugar to acid ratio herein is from 12:1 to 16:1, the most preferred range being 14:1 to 16:1.

In order to produce the superior natural orange concentrate of this invention, the orange juice must be processed with a minimum of exposure to oxygen and a minimum exposure to temperatures above 40° C. The oranges are first washed with a disinfecting solution, preferably a hypochlorite solution. The oranges are then thoroughly rinsed with water before subjecting them to juice extraction.

Juice extraction can be carried out by any of the automatic juicing machines, or by hand-squeezing the oranges. The type of equipment used to extract the juice is not critical. However, one which minimizes extraction of peel oil is preferred. The peel oil content of the juice should be below 0.05%, preferably between 0.01% to 0.03%.

Peel oil contributes a bitter note to orange juice. Therefore its concentration in the final product should not exceed 0.035%. The peel oil is found in both the serum and the separated pulp. The pulp can adsorb the peel oil and the concentration of peel oil in the pulp portion can, at times, be greater than in the serum portion. The peel oil content of the pulp must be considered when calculating the peel oil content of the final concentrate.

The raw juice exiting from the extractor or squeezing device contains pulp, rag and seeds. The rag and seed are separated from the juice and pulp in a finisher. The size of the screen in the finisher controls both the quantity and the size of the pulp desired in the juice.

The screen size may vary from about 0.5 mm to about 2.5 mm. When the screen is above 2.5 mm small seeds contaminate the juice.

In order to maintain the quality, freshness, and to retain the aroma and flavor compounds, the orange juice should be immediately chilled to a temperature below about 30° C., preferably below 5° C., after it is removed from the extractor and finisher.

The juice contains from about 4% pulp to about 25% pulp, from about 7% to about 20% soluble solids; the balance of the juice is water.

The juice is then separated into a pulp portion and a serum portion. The separation is accomplished under an inert atmosphere. The inert atmosphere may be accomplished by using a nitrogen blanket over the separating unit or other non-reactive, non-oxidative gas such as helium or argon. It is important that this separation be accomplished in the absence of oxygen.

A separator which gives a cleanly separated pulp portion and serum portion is preferred for the separation step. The serum portion should contain suspended solids of a particle size less than 80 microns. A high-speed centrifuge is preferred for this separation. The preferred centrifuge is a Westfalia centrifuge of the bowl-disc type which operates at an rpm of from 8000 to 9500.

The pulp portion is separately stored in closed containers away from light, at temperatures below about 0° C. for later addition to the concentrated serum. The pulp portion contains the pulp, suspended solids, and the solids which are soluble in, adsorb to, or are associated with the pulp.

The serum portion commprises about 80% to 93% water and about 7% to 20% non-aqueous compounds which are soluble solids and suspended solids less than 80 microns in size. The soluble solids comprise both volatile and nonvolatile compounds.

The serum portion is concentrated by freeze concentration or sublimation concentration. The freeze concentration is accomplished in a manner in which the water is removed as substantially or essentially pure ice crystals. Adhering solids or occluded solid compounds are not present in the ice and therefore are not removed with the ice.

The system should be closed and under an inert atmosphere. The use of a closed system prevent loss of the low boiling aroma and flavor compounds. The inert atmosphere prevents oxidation of the volatile and nonvolatile compounds.

A highly preferred embodiment involves a freeze concentrator which has a scraped wall heat exchanger connected to an adiabatic recrystalllizer tank. This adiabatic tank allows the crystals to recrystallize and grow in size under conditions such that essentially pure ice is formed. A filter at the exit of the tank retains all crystals of more than 100 microns in size. This insures that most ice nuclei are retained for the recrystallization. The recrystallized ice is separated by the use of a wash column from the concentrated juice. The wash column rinses any adhering concentrate from the ice crystals. It expedites removal of essentially pure ice from the freeze concentrator.

A preferred apparatus for use in freeze concentration is the Grenco freeze concentration unit. This unit is described in U.S Pat. No. 3,777,892, issued to Thijssen, 1973, U.S. Pat No. 3,872,009, issued to Thijssen, 1975, and U.S. Pat. No. 4,004,896, issued to Thijssen et al., 1977.

Sublimation concentration is an alternative concentration method. Sublimation concentration employs a conventional freeze drying apparatus which removes water as pure vapor.

The orange juice which may or may not contain pulp is frozen solid. Preferably, this will be done with agitation in a closed system under an inert atmosphere. The agitation causes large crystal growth.

The frozen juice is then held below the eutectic temperature of the juice. The eutectic temperature is the melting/freezing point of the juice or serum. For fresh juice of 12% solids concentration, this is about −2.5° C. at ambient pressure. For a juice of 35% solids concentration, this is about −25° C.

As the water is removed from the juice, the temperature must be carefully maintained to keep the frozen juice in a solid state. This is important for retaining the maximum amount of the volatile compounds.

Other methods of removing the water from the serum as essentially pure water comprise a freeze concentration step to about 25% to 35% solids followed by a sublimation concentration step to concentrate to from about 40% to about 87% solids. The sublimation step, in this case, must accomplished so that the surface temperature of the 30% solids solution initially does not exceed about −30° C. to about −25° C. A vacuum of less than 100 microns is used.

The water removal step, sublimation concentration, or freeze concentration followed by sublimation concentration must be performed under conditions which avoid substantially any oxidative degradation of the solids present in the serum. Thus, the freeze concentration system must be closed and the juice entering the concentrator should preferably be under a blanket of inert gas such as nitrogen, argon, helium.

The concentrated serum resulting from sublimation concentration or a combination of freeze concentration and sublimation concentration contains at least 35% solids and up to 87% solids. Substantially all of the non-volatile compounds originally present in the soluble solids portion of the serum are in the concentrated serum. Thus, at least 99% of the non-volatile compounds are retained. At least 65% of the volatile compounds originally present in the juice are also retained in this concentrated serum.

The pulp content and size of the pulp depends upon the method and manner of squeezing the juice and of separating it from the juice before concentration.

The size of the pulp affects the perception of the amount of pulp within the juice. An orange juice concentrate containing 10% of pulp of a 0.50 mm size is perceived as having very little pulp in it as compared to a juice having 10% of pulp of a 10 mm size. Thus, not only is the amount of pulp present important in preparing a consumer acceptable product, but also the size of the pulp. It has been found that a concentration of pulp in the range of from 5% to 19% (volume/volume [hereinafter V/V]) is an acceptable concentration in an orange juice concentrate. The pulp percentage is measured by centrifuging. The size of the pulp should be between 0.1 mm and about 10 mm. Preferably the amount of pulp will be 6% to 12% (V/V) having a size of 0.50 mm to 5 mm.

The concentrated serum contains from about 35% to about 87% solids. This concentrated serum is blended with the from 30% to 100% of the pulp fraction to produce an orange juice concentrate having from about 5% to about 15% (V/V) of the pulp portion and 85% to 95% of the concentrated serum. Preferably the blend will have from 7% to 12% (V/V) pulp.

The orange juice concentrate is then packed into cans, foil containers, bottles, etc. To insure long-term oxidative stability, the packaging compounds will be impermeable to oxygen. Optionally, the concentrate can be packed under nitrogen.

The product is stored at 0° C. or below for long-term storage. Preferably, it will be stored at −20° C. to −80° C.

This orange juice concentrate made by the process outlined above may be admixed with a conventionally processed, evaporatively concentrated, juice, provided the dilutions do not exceed amounts which would result in a change of the key parameters set forth above. That is, the novel frozen concentrate of the present invention may be diluted with conventional concentrate, provided that at least 0.1% of the volatile compounds is ethyl butyrate, the proportion of the ethyl butyrate to limonene is within the range of 0.0015 to 1 to 0.6:1, and at least 65% of the volatile flavor and aroma compounds originally present in the juice are present in the final juice concentrate.

There are two benefits arising from this optional dilution step. First, there are economic advantages in diluting the concentrate of the present invention with conventional, evaporative concentrate. Furthermore, as discussed above, the evaporative techniques used to make conventionally processed juice frequently result in loss of volatile aroma and flavor compounds, in oxidation of various compounds in the juice, and in the development of "burnt" or browned flavor notes. These factors result in a significant deterioration in quality, aroma and flavor of the concentrated juice. To counteract this problem, fresh juice or essence typically is mixed with the evaporative juice. Because of its unique flavor and aroma characteristics, however, the concentrate of the present invention is more acceptable as the cutback juice to consumers than the fresh juice or essence currently used.

The natural orange juice concentrate prepared by the process herein described is unique in the retention of at least 65% of the volatile compounds originally present in the orange juice. Gas chromatographic analyses of the volatile portion of the serum indicate that there are at least 250 compounds, and probably considerably more present in the volatile portion of the serum. Complete identification of these volatile compounds has not yet been achieved. These volatile compounds which are responsible for the aroma and flavor character of the concentrate are composed of alcohols, carbonyl compounds, acids, esters, terpenes and other voltaile hydrocarbons. The low boiling fraction, as described above, contains large amounts of ethanol and acetaldehyde. Other key lower boiling compounds are ethyl butyrate, methanol, butanol, hexanal, etc. The retention of the ethyl butyrate at a level of 0.1% of the volatile compounds, i.e. at least about 60% of the ethyl butyrate originally present in the juice, is unique to this invention.

Ethyl butyrate is partially responsible for the fruity character of orange juice. Its presence alone, even with the ethanol, acetaldehyde and hexanal, does not produce the entire orange aroma and flavor. Its retention, along with the retention of at least 65% of the total volatile compounds is indicative of the retention of compounds which are present even in very minute amounts.

The higher boiling fraction, i.e. those compounds with boiling points above 131° C., contains limonene, alpha-pinene, beta-pinene, myrcene and geranial and other lesser volatile compounds. Limonene, at lower levels, is an important constituent of the orange flavor and orange aroma. The amount of limonene which should be present in the orange juice concentrate is from about 40% to about 98% of the total volatile compounds in the concentrate. More highly preferred compositions are those which contain from about 50% to about 80% limonene.

The proportion of ethyl butyrate to limonene should be in the range of from about 0.0015:1 to about 0.6:1. Preferably, this range will be in the ratio of 0.004:1 to 0.4:1. This ratio represents a preferred aroma and flavor composition.

The ratio of the low boiling fraction to the high boiling fraction should be at least 4:1. This ratio may be as high as 17:1. The preferred compositions herein have a low boiling fraction to high boiling fraction ratio in the range of 6:1 to about 12:1. As noted above, the limonene concentration is not used in the calculation of the gas chromatographic counts of the high boiling fraction for the purpose of defining this ratio.

Many fresh juices contain volatile sulfur compounds. One of these compounds is hydrogen sulfide. The hydrogen sulfide gives a heavy note to the aroma and flavor of orange juice or an orange juice concentrate. Some juices may contain as much as 200 ppb to 500 ppb hydrogen sulfide. The juice must stand for several hours in order to have this hydrogen sulfide evaporate.

The orange juice concentrates herein have less than organoleptically detectable amounts of hydrogen sulfide. Thus, the hydrogen sulfide content is less than about 20 ppb.

The optional pasteurization step is important for maintaining the storage stability of the orange juice concentrate. Pasteurization controls the concentration of the bacteria and other microbes so that the product does not deteriorate on storage, or does not deteriorate when reconstituted after a reasonable period of time.

Moreover, pasteurization reduces the activity of the pectin esterase enzyme. Pectin esterase is believed to be responsible for demethylating the pectin and thus destroying the cloud of the orange juice. Pectin esterase is somewhat active even at 0° C. Thus, the highly preferred compositions herein will contain a minimal level of pectin esterase enzyme. A pectin esterase activity of below 1.5 $(PE)_u \times 10^4$, preferably an activity of below 0.5 $(PE)_u \times 10^4$, is achieved by pasteurization.

The concentrated product is optionally pasteurized by using a high temperature, short residence pasteurization technique. The juice, pulp or concentrate is heated to a temperature of from about 80° C. to about 95° C. for from about 3 to about 12 seconds. The juice or concentrate is then rapidly cooled to a temperature of about −10° C. to about 5° C. The system used to pasteurize the juice must be closed and be conducted in a manner such that the juice is not exposed to an oxidative atmosphere.

The pasteurization step can be at any stage in the processing.

The concentrate can be reconstituted by dilution with water to prepare an orange juice beverage. A 41.8% to 44.8% solids concentrate is diluted with 3 parts of water to 1 part concentrate. A 73.2% to 78.4% concentrate is diluted with 6 parts of water to 1 part of concentrate. Carbonated water can be used to form a carbonated beverage.

The concentrated serum, with or without the added pulp, can also be used as a flavorant in beverages, baked goods, culinary mixes, candies, frostings, salad dressings and other food products.

ANALYTICAL PROCEDURES

Determination of Pulp Level

The pulp level is determined according to the USDA standards as approved by the Florida Citrus Code, Part 16. The pulp is determined by centrifuging the juice at 367.3 g's for 10 minutes. The percent of pulp is then calculated on a Volume to Volume (V/V) basis.

GAS CHROMATOGRAPHIC ANALYSIS - METHOD 1

Sampling System

The sampling system comprises a cylindrical glass vessel with openings on both ends connected by Teflon tubing to 3-way valves. One valve (Valve A) is connected to a helium source, and the second valve (Valve B) is connected to a collecting coil immersed in liquid nitrogen. The collecting coil is connected by a third valve to the inlet port of a standard gas chromatograph equipped with a flame ionization detector. The cylindrical sweeping vessel is placed horizontally in a constant temperature water bath.

PROCEDURE

Twenty-five g. of an orange juice sample is placed in the sweeping vessel. The sample is fresh juice or a concentrate diluted to a concentration of 10% to 15% solids. The sweeping vessel has a capacity of 626 ml and has a 5 cm inner diameter and a length of 27.5 cm. The vessel is suspended in a 40° C. constant temperature bath using a Burrell Wrist-Action shaker set on the lowest shaking setting, 276 oscillations per minute. Fifteen minutes after the sweeping vessel is placed in the bath and the shaker started, a helium flow regulated at 50 ml/minute (measured on a Gilmont size "10" flowmeter) is passed through the vessel and into the stainless steel collecting coil immersed in liquid nitrogen. The outside diameter of the coil is ⅛", the length of the coil is 13.4". The coil is vented to the atmosphere. The flow of helium through the sweeping vessel is continued for 5 minutes.

After this 5 minute period, all of the valves are closed and the liquid nitrogen bath removed from the collecting coil. The collecting coil is then heated to 200° C. with a heat gun, while at the same time, the adjacent lines, the glass vessel to collecting coil line and collecting coil to gas chromatograph line, are being heated to about 105° C. with a heat tape. When the coil reaches 200° C., the gas chromatograph is started. Valves A and B are opened to direct helium flow into the coil through a line bypassing the sweeping vessel. The valve on the coil is set to direct the flow of the helium into the gas chromatograph.

A Hewlett Packard 5880 gas chromatograph equipped with a Hewlett Packard 5880A terminal is used. The detector is a flame ionization type. The glass capillary column is 150 meters long by 0.5 mm internal diameter. The capillary column is coated with SF-96 obtained from Chromepack, Inc. SF-96 is a methyl silicone fluid.

The gas chromatograph is at a column flow rate of 2½ ml/minute. Initial oven temperature is 25° C. with an initial oven time of 12 minutes. The chromatograph is programmed to automatically change the temperature of the oven at the rate of 3° C./minute to a final oven temperature of 180° C. and held at that temperature for a 16 minute period. The injector temperature is 250° C. and the detector temperature is 300° C. The split vent is set at 250 ml/minute with a split ratio of 1:100. The auxiliary make-up flow is set at 40 ml/minute. After each run, the oven is maintained at a temperature of 180° C. for 10 additional minutes.

The integrator is set to a threshhold of 1, a peak width of 0.02 seconds, and an attenuation of 2×2.

Figure 6:
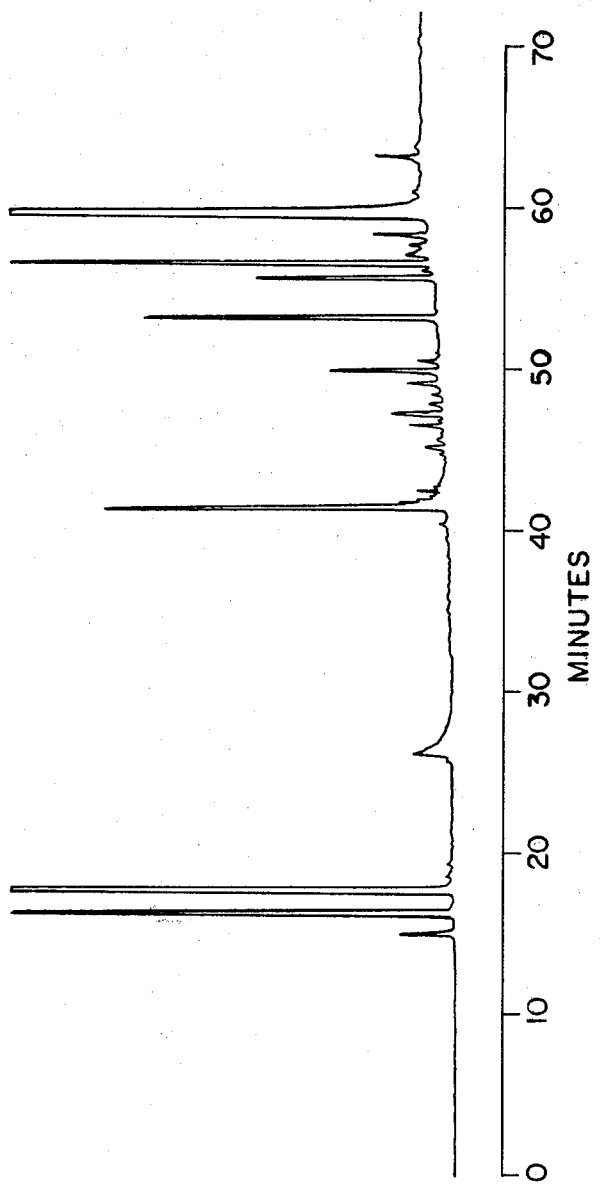

The gas chromatographic tracing of a typical orange juice (pineapple variety) is shown in FIG. 6.

The recorder is a linear recorder which did not change the attenuation according to peak height. Thus the largest peak in the low boiling region (ethanol) and the largest peak in the high boiling region (limonene) are flattened at the top. A representative integration of the areas of some of these peaks is given below.

| Compound | FIG. 6 (orange juice) | | |
|---|---|---|---|
| | Retention Time (min.) | Area (%) | Area (counts) |
| acetaldehyde | 15.9 | 1.26 | 693.2 |
| methanol | 16.03 | 0.58 | 319.0 |
| ethanol | 17.37 | 16.96 | 9344.5 |
| ethyl butyrate | 41.93 | 0.79 | 437.2 |
| hexanal | 42.27 | 0.13 | 73.58 |
| alpha-pinene | 54.1 | 0.52 | 284.7 |

-continued

| | FIG. 6 (orange juice) | | |
|---|---|---|---|
| Compound | Retention Time (min.) | Area (%) | Area (counts) |
| myrcene | 57.5 | 1.73 | 952.22 |
| beta-pinene | 56.2 | 0.31 | 170.7 |
| limonene | 60.73 | 76.4 | 42080.4 | total GC counts 55081.9

GAS CHROMATOGRAPHIC ANALYSIS (METHOD 2)

A cylindrical glass vessel 15.2 cm high, 7.52 cm diameter having a total volume of 350 ml is used. The glass vessel is closed with a glass cap fitting onto the vessel with an O ring. The vessel cap had one inlet pipe reaching 15 cm into the glass vessel but not below the surface of the liquid and one outlet pipe. Both of these pipes were made of ¼" glass tubing.

Ten ml of the sample juice is placed into the glass vessel. The sweeping vessel is equipped with a Teflon-coated stirring bar (3×1 cm) to keep the sample thoroughly mixed during the sweeping. Fifty ml of nitrogen/minute for 5 minutes is used for sweeping. During this time the vessel is submerged in a constant temperature water bath at 40° C. ± 0.5° C.

The nitrogen is swept from the vessel and collected in a glass-lined stainless steel condensing coil 3" long by ⅛" in outside diameter. The condensing coil is immersed in a liquid nitrogen bath.

The condensing coil was connected to a Perkin-Elmer Model No. 99 gas chromatograph. The gas chromatograph is equipped with a sniff-port, a flame ionization detector, and a sulfur detector. The effluent is divided between these ports in the ratio of 3:1:1 respectively. Manifold temperature is about 195° C. The attenuation setting on the flame ionization detector was "2", and the range is set at "1". The peaks resulting from the eluting compounds are measured using a Spectra-Physics, Inc., autolab system 1 computing integrator. The recorder is a Hewlett Packard Model 3138-A two-point recorder.

The gas chromatographic temperature profile was programmed as follows: oven temperature at 25° C. for 12 minutes, a 3° C. increase per minute for 51 minutes, then isothermal at 180° C. for an additional 16 minutes.

The compounds were identified by retention time of known standards, combination of gas chromatograph with mass spectroscopy, and treatment of the juices with esterase.

Figure 4:
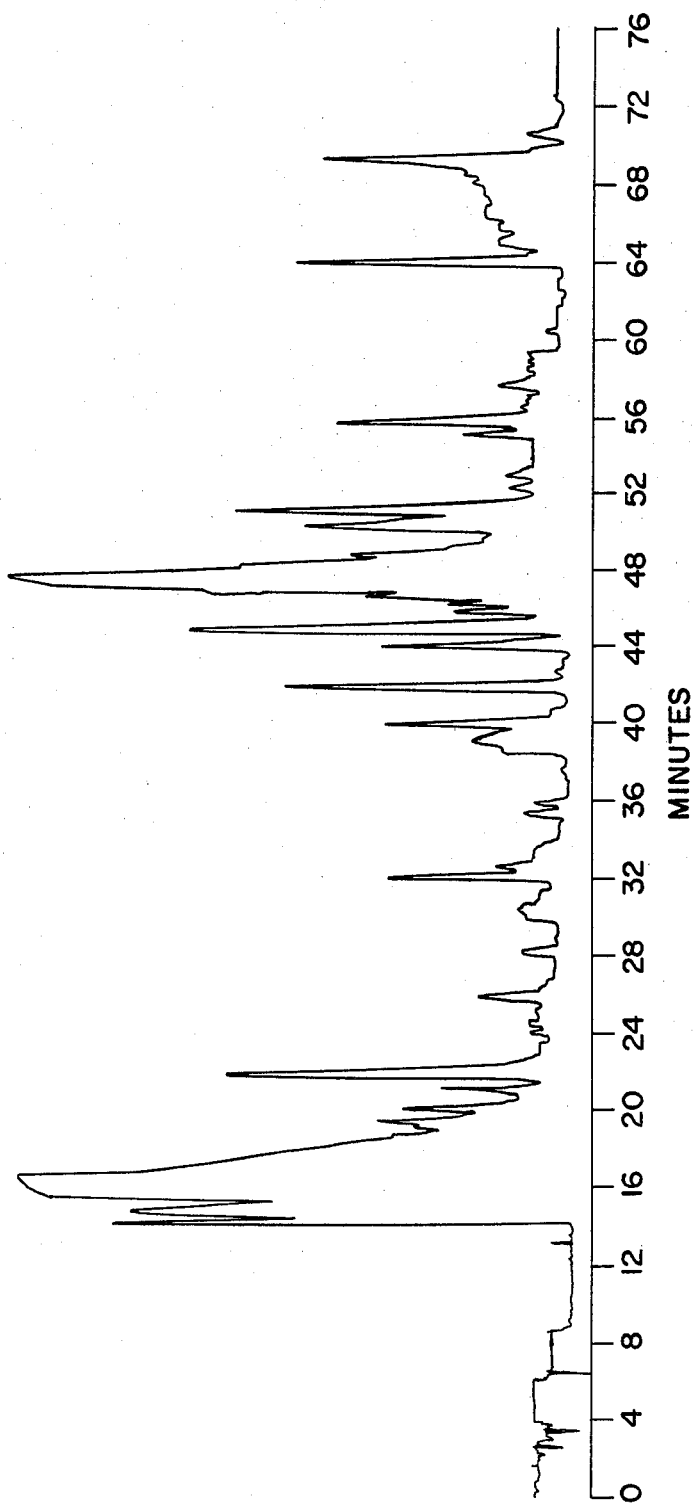
Figure 5:
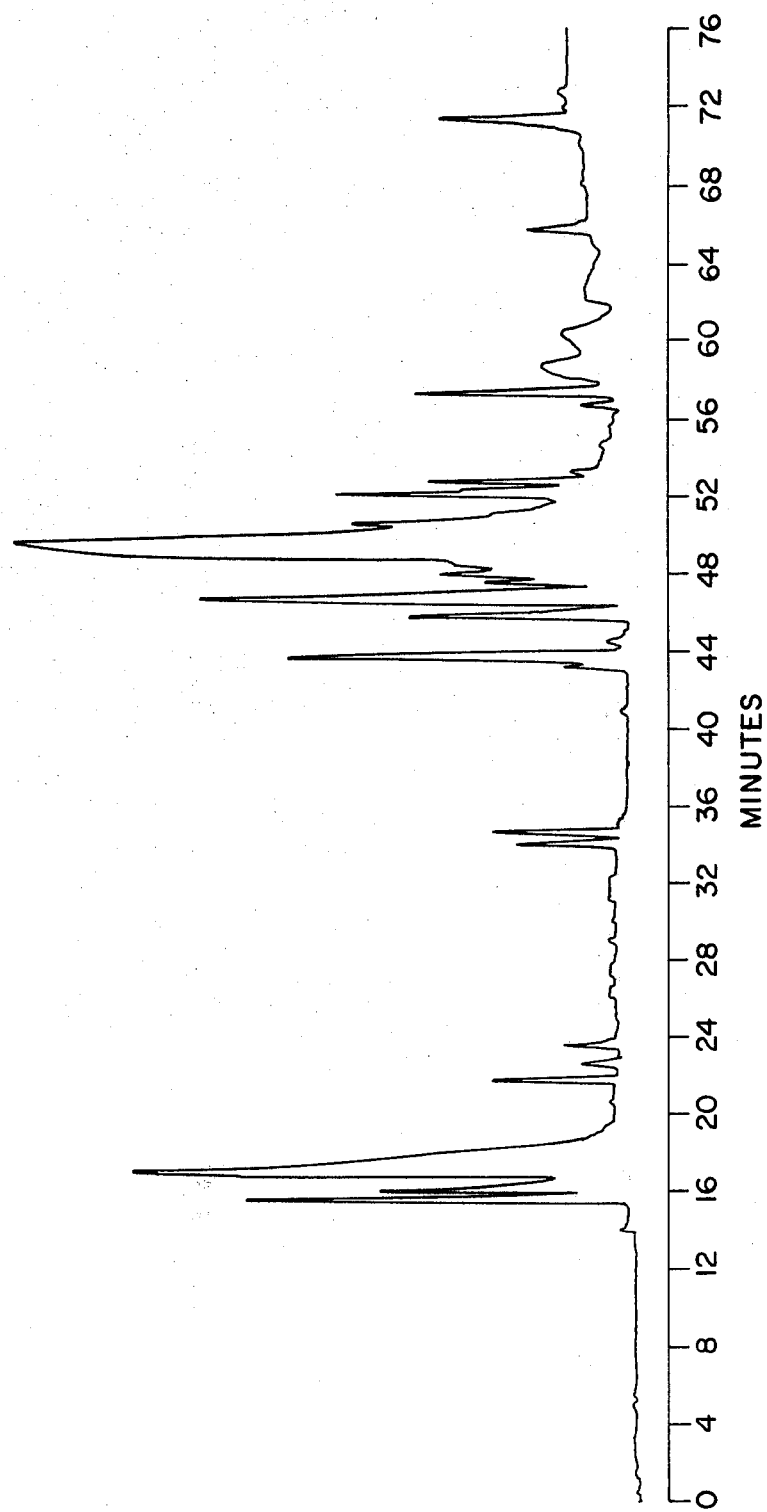

This method was used to obtain gas chromatographs of a typical orange juice (FIG. 2), a concentrate prepared as in Example I (FIG. 3), a concentrate prepared by using a Contherm®freeze concentration method (FIG. 4), and a commercial evaporated juice believed to have essence and fresh juice added to it (FIG. 5).

The recorder used to prepare these chromatographs changed the attenuation according to peak height to keep the peak areas on the graph paper. The instrument automatically integrated the peak areas. Some of the representative compounds are identified for each spectra.

Figure 2:
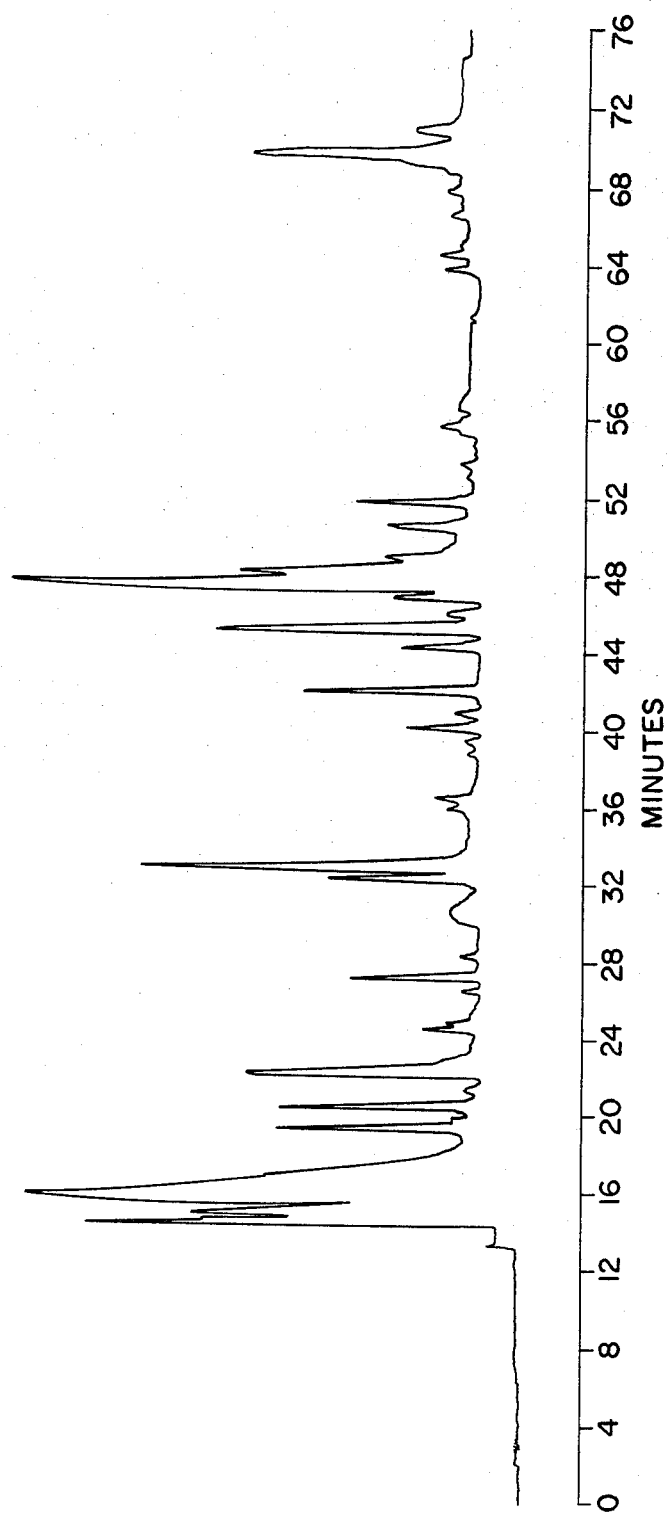
FIGS. 2 through 6 are comparative gas chromatograms of orange juice and orange juice concentrates.

| | FIG. 2 (orange juice) | | |
|---|---|---|---|
| Compound | Retention Time (min.) | Area (%) | Area (counts) |
| acetaldehyde | 14.1 | 3.17 | 202,700 |
| methanol | 14.9 | 1.67 | 106,588 |
| ethanol | 16.0 | 41.19 | 2,631,878 |
| hexanal | 32.5 | 0.18 | 11,761 |
| ethyl butyrate | 33.0 | 3.59 | 229,349 |
| alpha-pinene | 42.1 | 0.27 | 17,299 |
| myrcene, beta-pinene | 45.3 | 1.25 | 79,768 |
| limonene | 47.9 | 45.18 | 2,887,156 | total GC counts 6,390,213

Figure 3:
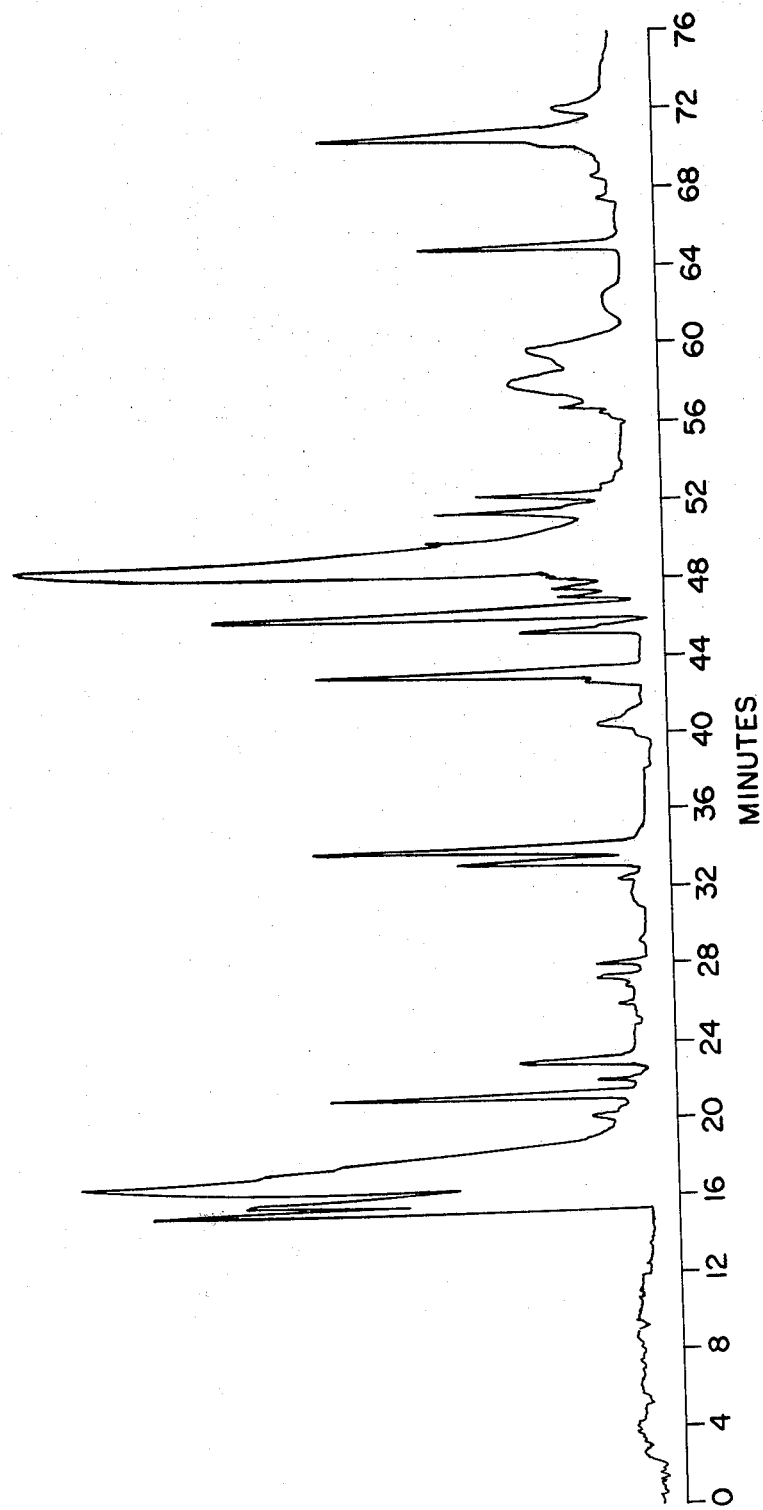

| | FIG. 3 (orange juice concentrate prepared as in Example I) | | |
|---|---|---|---|
| Compound | Retention Time (min.) | Area (%) | Area (counts) |
| acetaldehyde | 15.2 | 1.80 | 157,981 |
| methanol | 15.7 | 1.16 | 101,371 |
| ethanol | 17.0 | 24.05 | 2,107,720 |
| hexanal | 33.2 | 0.07 | 6,179 |
| ethyl butyrate | 34.0 | 0.34 | 30,162 |
| alpha-pinene | 43.0 | 0.31 | 27,553 |
| beta-pinene, myrcene | 46.2 | 1.4 | 123,057 |
| limonene | 49.1 | 69.69 | 6,108,952 | total GC counts 8,764,732

| | FIG. 4 (freeze concentrated product using open processing) | | |
|---|---|---|---|
| Compound | Retention Time (min.) | Area (%) | Area (counts) |
| acetaldehyde | 14.2 | 1.09 | 211,947 |
| methanol | 14.8 | 3.1 | 602,689 |
| ethanol | 16.2 | 59.3 | 11,515,039 |
| hexanal | 32.1 | 0.04 | 7,529 |
| ethyl butyrate | 32.8 | trace | trace |
| alpha-pinene | 41.9 | 0.16 | 32,293 |
| beta-pinene, myrcene | 45.0 | 0.75 | 146,484 |
| limonene | 48.3 | 34.06 | 6,614,322 | total GC counts 19,421,625

| | FIG. 5 (commercial evaporated juice) | | |
|---|---|---|---|
| Compound | Retention Time (min.) | Area (%) | Area (counts) |
| acetaldehyde | 15.4 | 0.41 | 37,333 |
| methanol | 16.0 | 0.10 | 9,725 |
| ethanol | 17.0 | 5.34 | 489,145 |
| hexanal | 34.0 | 0.03 | 2,973 |
| ethyl butyrate | 34.6 | 0.04 | 3,919 |
| alpha-pinene | 43.7 | 0.45 | 41,439 |
| beta-pinene, myrcene | 46.8 | 2.16 | 198,227 |
| limonene | 50.1 | 90.54 | 8,291,948 | total GC counts 9,158,604

As is evident from these analyses, natural orange juices have varying amounts of ethyl butyrate (0.79% and 3.59%) and of limonene (76.4% and 45.18%). However, only the orange juice concentrate as prepared in Example I has at least 0.1% ethyl butyrate, i.e., 0.34% as compared to 0.04% and trace amounts for concentrates prepared by evaporation and open processing freeze concentration, respectively. The ethyl butyrate to limonene ratio of the orange concentrate of this invention (FIG. 3) is 0.005:1 as compared to a ratio of 0.0005:1 for evaporative concentrate and about 0 for the open processed concentrate.

HYDROGEN SULFIDE ANALYSIS

A Perkin-Elmer Sigma 1 gas chromatograph with flame photometric detector was used. An all-Teflon system was required because of the tendency for glass and metal columns to absorb hydrogen sulfide and other similar compounds. A Teflon column 24 feet long by $\frac{1}{8}$" outer diameter was used. A 40/60 mesh Chromosorb support was used containing 12% polyphenylether phosphoric acid. Carrier gas used for analysis was air, and the flow rate was 34 ml/minute. A 10 ml sample was drawn from a 50 ml headspace above the juice sample. Calibrations were done using appropriate standards.

IDENTIFICATION OF ETHYL BUTYRATE

The boiling points of hexanal and ethyl butyrate are close. Hexanal and ethyl butyrate are eluted from the columns at or about the same retention time. Therefore, the presence of ethyl butyrate in the composition can be determined by the following test procedure. Ten ml of an orange juice concentrate (44.8% solids) was diluted with water (3 parts of water per one part of concentrate was used). The pH was adjusted to 8 using 1N sodium hydroxide. Three drops of an esterase solution (Sigma E-3128, lot 68C-8135, 8 mg of protein/ml 120 units/mg protein) was added to the alkaline orange juice. The solution was incubated for 30 minutes at 24° C. in the sampling vessel. The gas chromatographic analysis method 2 was used (capillary column coated with FF-96-Perkin-Elmer GC) to measure the volatile compounds present. The peak in the chromatogram which was tentatively identified as ethyl butyrate was absent after treatment with this esterase solution. This peak had a retention time of approximately 30.5 minutes. The disappearance of the ethyl butyrate after esterase treatment was also confirmed using gas chromatographic mass spectroscopy combinations.

EXAMPLE I

Pineapple oranges of an average diameter of three inches were washed in a solution containing 100 ppm of hypochlorite. The oranges were rinsed with fresh tap water and passed into a juice extractor. An Automatic Machinery Equipment extractor, Model No. 400, which slices the oranges in half and then squeezes each half, was used. The gap setting between the reamer and holding cups was 3/16 inch.

A finisher using a 0.238 cm screen was used to separate the rag and seed from the juice.

The juice contained 12.6% solids (non-aqueous compounds) and 0.031% peel oil.

The juice was separated in a bowl-type centrifuge (Westfalia Corp., Model #SB-7-06-576) operating at a speed of 9500 rpm. Nitrogen was passed into the bowl of the centrifuge during the separation. The separated serum was poured into a refrigerated supply tank held at 0° C. and equipped with a 90 micron filter at the exit. The tank was shielded from the light. A nitrogen gas blanket was continually maintained in the supply tank.

The pulp ranged in size from 0.1 mm to 5 mm. The pulp was stored away from light at 0° C.

A Grenco freeze concentration unit, Model W8, was fed from the refrigerated supply tank. The Grenco system is a closed system.

The refrigeration unit and recirculation pump circulating the juice from the recrystallizer through the scraped wall heat exchanger were started and the juice was cooled down to $-2°$ C. Cooling down the juice to $-2°$ C. and formation of recrystallized ice was achieved after 2.5 hours at which point also the removal of ice via the wash column was started. After removal of the ice from the unit the juice concentration began to increase steadily to reach a concentration of 50% after a 46 hour period. With each ice removal step an equivalent quantity of fresh juice was pumped into the freeze concentrator. After 50% concentration was reached, the temperature of the recrystallizer had fallen to approximately $-10.2°$ C. At this point the removal of concentrated orange juice was started.

The concentrated orange juice was stored at $-10°$ C. until mixed with the pulp at the end of the experiment. The duration of this particular experiment was 201 hours. Approximately 6 liters of ice were removed per hour after reaching 50% concentration. A total of 295.7 liters of 50% concentrated orange juice was produced. Approximately 1200 liters of orange juice serum were required for the production of the concentrate.

The concentrated orange juice was then blended with approximately a 10% level of pulp (V/V) which had been removed from the juice before the freeze concentration step.

After blending of the pulp with the concentrated juice, the mixture was then filled into 6 oz. zip-lock cans and stored at $-20°$ C. until testing. The concentration of the final product was 46.8% solids.

The gas chromatograph showed 93.0% retention of volatile compounds. Ethyl butyrate retention was 89.7%, it was present at 0.34% of the volatile compounds. Ethyl butyrate to limonene ratio was at 0.009:1. The low boiling compounds to higher boiling compounds ratio is 10:1. The hydrogen sulfide level in the concentrate was less than 20 ppb.

The orange juice concentrate prepared by the above method was taste tested in a paired comparison test by randomly selected panelists. The orange juice concentrate was preferred by 62% of the panelists when compared to the starting juice.

When tested against an evaporative concentrated sample of the same starting juice, the orange juice concentrate of Example I was preferred by 72% of the panelists. The evaporated sample contained the first condensate (essence), as well as 30% fresh juice (cutback juice). The addition of these materials was done in an effort to simulate the best evaporative concentration techniques.

A Crepaco pasteurizer unit is used to pasteurize the concentrated serum prepared by Example I. The pasteurizer is a closed system consisting of three swept surface heat exchangers. The first uses 30 psi steam at about 129° C. to heat the serum to about 88° C. during the 7 second time period that the serum is in the heat exchanger. The heated serum then passes through consecutive swept surface heat exchangers at about 4° C. to rapidly cool the concentrated serum.

The bacteria analysis shows a bacteria plate count of less than 300 and a mold count of less than 100. The pectin esterase activity is reduced to below 1.0 (PE-$)_u \times 10^4$. The peel oil content is about 0.025%. Approximately 90% of the volatile compounds present in the starting concentrate are retained, including the ethyl butyrate.

EXAMPLE II

Sublimation Concentration

Approximately 1.9 liters of the orange juice concentrate as prepared in Example I containing about 10% pulp and at a concentration of about 35% solids concentration was cooled to −7° C. The juice was cooled in a hermetically sealed plastic bag placed in a tray measuring about 51×37×2 cm. The thickness of the juice layer was about 1 cm.

The tray was attached to a vibrator. The tray was vibrated for 2 hours at about −7° C. to obtain continuous mixing of the ice crystals to achieve recrystallization and the growth of large ice crystals.

After the vibration period the temperature was decreased to −60° C. over a period of about 2 hours. During this cooling period the slush-like mixture of ice and concentrate solidified to a hard, frozen mass. The frozen compound was then ground on a Buss-Condux ®mill and separated using a Sweco continuous sieving device. Particles ranging from 800 to 1500 microns were selected. These particles were then subjected to sublimation concentration. The particles were placed in a standard freeze dryer having an ice condensation capacity of about 10 liters. A rigid temperature and vacuum program was maintained to keep the particles from melting. For the first 30-45 minutes the particles were kept at −30° C. under a vacuum of 20 microns. The temperature was then adjusted to about −10° C. and maintained for 30 minutes at that temperature under a vauum of 20 microns. The temperature was then adjusted to 10° C. and again maintained for 30 minutes. The temperature was then increased a third time to about 30° C. After a total sublimation of time of 2.5 hours, the orange juice concentrate was taken from the tray while still frozen. It was placed in a jar and capped.

Gas chromatographic analysis on the sublimation concentrated sample after dilution to a 12.6% solids concentration revealed a retention of 96.3% of the volatile compounds which were present in the original juice. The final solids concentration of the orange juice was 60 percent.

The ethyl butyrate level of the volatile compounds was 0.37%. The ethyl butyrate to limonene ratio was 0.005:1.

EXAMPLE III

A 35% orange juice concentrate as prepared in Example I containing about 10% pulp was quickly frozen at −40° C. About 500 ml of concentrate was frozen in a tray 51×37×2 cm.

The sublimation concentration was carried out using the same equipment as in Example II.

The sublimation process was carried out under isothermal conditions at −30° C. for 16.5 hours at a vacuum of 20 microns. The slab of frozen orange juice concentrate did not melt during the sublimation concentration. The final concentration was 67% solids content.

The concentrated product was diluted with 5 parts of water to 1 part concentrate. Expert tasters could not distinguish it from the starting concentrate.

The retention of the volatile compounds was 96%.

EXAMPLE IV

When the concentration of Example III was repeated using an isothermal drying temperature of −25° C. for 17 hours, a final concentrate of 81% solids concentration was prepared.

The retention of the volatile compounds was 94% of those present in the starting orange juice, including ethyl butyrate.

EXAMPLE V

Approximately 7.5 liters of the orange juice concentrate as prepared in Example I containing about 10% pulp and at a concentration of about 35% solids concentration was blended with 2.5 liters of conventional evaporative concentrate containing about 62% solids concentration. The evaporative sample contained the first condensate (essence), as well as 30% fresh juice (cutback juice). These materials were added in an effort to simulate the best evaporative concentration techniques.

The gas chromatograph showed that ehtyl butyrate was present at 0.29% of the volatile compounds. The ethyl butyrate to limonene ratio was 0.0034:1. The ratio of low boiling compounds to higher boiling compounds was 4.3:1.

The freeze concentrate-evaporative concentrate blend was taste tested in a paired comparison test with a conventional evaporative concentrated sample. The blend was preferred by 66% of the panel.

EXAMPLE VI

Orange juice concentrate as prepared in Example I containing about 10% pulp and at a concentration of about 50% solids was blended with an equal amount of the conventional evaporative concentrate of Example V. The gas chromatograph showed that ethyl butyrate was present at 0.18% of the volatile compounds and that the ethyl butyrate to limonene ratio was 0.0023:1. The ratio of low boiling compounds to high boiling compounds was 5.3:1.

What is claimed is:

1. A natural orange juice concentrate prepared from orange juice, said concentrate comprising:
   (1) at least 35% total solids, originally present in the juice, comprising pulp, nonvolatile compounds, and volatile compounds, the balance being water;
   (2) two of said volatile compounds being ethyl butyrate and limonene;
   (3) at least 0.1% of said volatile compounds being ethyl butyrate;
   (4) the proportion of said ethyl butyrate to said limonene being in the range of about 0.0015:1 to about 0.6:1;
   (5) said volatile compounds comprising a low boiling fraction and a high boiling fraction, the ratio of the low boiling fraction to the high boiling fraction being at least about 4:1;
the amounts and proportions of said volatile compounds are determined by a gas chromatographic analysis of the headspace volatile compounds released from a sample of orange juice, said sample having a temperature of 40° C.

2. A concentrate according to claim 1 wherein said volatile compounds are at least 65% of the volatile compounds originally present in the juice.

3. A concentrate according to claim 2 wherein the total solids content is in a range of about 40% to about 87%.

4. A concentrate according to claim 3 wherein said volatile compounds are at least about 75% to about 95% of the volatile compounds originally present in the juice.

5. A concentrate according to claim 3 wherein the proportion of ethyl butyrate to limonene is in the range of 0.004:1 to 0.5:1.

6. A concentrate according to claim 3 wherein the concentration of ethyl butyrate is at least 0.4%.

7. A concentrate according to claim 5 wherein the sugar to acid ratio is from 12:1 to 16:1.

8. A concentrate according to claims 1, 2, or 7 having a pulp content of from 5% to 19% (V/V).

9. A natural orange juice concentrate prepared from orange juice, said orange juice comprising:
   a pulp portion and a serum portion;
     said serum portion comprising about 80-93% water and about 7-20% non-aqueous compounds;
     said non-aqueous compounds portion comprising nonvolatile compounds and volatile compounds;
     said volatile compounds comprising a low boiling fraction and a higher boiling fraction;
     said low boiling fraction containing ethyl butyrate; and said higher boiling fraction containing limonene;
   said concentrate product comprising:
     (1) at least 35% total solids comprising pulp, nonvolatile compounds, and volatile compounds;
     (2) substantially 100% of the nonvolatile compounds originally present in the solids portion of said serum;
     (3) at least 65% of the volatile compounds originally present in the solids portion of said serum;
     (4) at least 0.1% of said volatile compounds being ethyl butyrate;
     (5) the proportion of said ethyl butyrate to said limonene being in the range of about 0.0015:1 to about 0.6:1; the amounts and proportions of said volatile compounds are determined by a gas chromatographic analysis of the headspace volatile compounds released from a sample of orange juice, said sample having a temperature of 40° C.

10. A concentrate according to claim 9 wherein the total solids content is in a range of about 40% to about 87%.

11. A concentrate according to claim 10 wherein the volatile compounds are present in a range of about 75% to about 95% of the volatile compounds originally present in the serum.

12. A concentrate according to claim 10 wherein the proportion of said low boiling fraction to said higher boiling fraction is in the range of about 4:1 to about 12:1.

13. A concentrate according to claim 11 wherein the proportion of ethyl butyrate to limonene is in the range of 0.004:1 to 0.5:1.

14. A concentrate according to claim 10 having a solids content of from 60% to about 87%.

15. A concentrate according to claim 10 wherein the sugar to acid ratio is from 12:1 to 16:1.

16. A concentrate according to claims 9 or 10 having a pulp content of from 5% to 19% (V/V).

17. A concentrate according to claim 15 wherein the pulp content is from 9% to 12% (V/V) and the pulp size ranges from 0.5 mm to 5.0 mm.

18. A concentrate according to claims 9, 10, 11, 12, 13, or 14 which is further characterized by being substantially free of enzyme activity.

19. A concentrate according to claims 9, 10, 11, 12, 13, or 14 which is further characterized by being substantially free of microorganisms.

20. A concentrate according to claims 9, 10, 11, 12, 13, or 14 which is further characterized by being substantially free of oxidative degradation products.

21. A concentrate according to claims 9, 10, 11, 12, 13 or 14 which is further characterized by being substantially free of organoleptically detectable hydrogen sulfide.

22. A concentrate according to claims 9, 10, 11, 12, or 14 which is further characterized by being substantially free of microorganisms, enzyme activity, oxidative degradation products and hydrogen sulfide.

* * * * *